US012214475B2

(12) United States Patent
Ellis

(10) Patent No.: US 12,214,475 B2
(45) Date of Patent: Feb. 4, 2025

(54) RETAINER INSTALLATION TOOL

(71) Applicant: Toyota Motor Engineering & Manufacturing North America, Inc., Plano, TX (US)

(72) Inventor: David W. Ellis, Evansville, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 17/695,306

(22) Filed: Mar. 15, 2022

(65) Prior Publication Data

US 2023/0294257 A1 Sep. 21, 2023

(51) Int. Cl.
*B25B 27/02* (2006.01)

(52) U.S. Cl.
CPC .................................... *B25B 27/02* (2013.01)

(58) Field of Classification Search
CPC ......... B25B 27/00; B25B 27/02; B25B 27/12; B25B 27/28; B25B 27/023; B25B 27/10; B25B 27/062; B25B 27/0028; B25B 27/14
USPC ..... 29/273, 243, 253, 252, 523, 270; 81/486
See application file for complete search history.

(56) References Cited

U.S. PATENT DOCUMENTS 3,087,235 A 4/1963 Porter
3,446,101 A * 5/1969 McKay ................. B25B 27/143 81/53.2
3,965,776 A 6/1976 Wolstenholme et al.
4,265,009 A * 5/1981 Mann ...................... B25B 27/16 29/244
4,765,029 A 8/1988 Rogan
7,222,404 B1 5/2007 Lindsey et al.
7,637,527 B2 12/2009 Mazanek et al.
8,474,107 B2 7/2013 Baumgartner et al.
9,541,194 B2 1/2017 Haruna et al.
9,833,888 B2 12/2017 Lambert
10,005,270 B2 * 6/2018 Rist ...................... G01N 21/645
2008/0028577 A1 2/2008 Soman et al.
2012/0026844 A1 * 2/2012 Burkhardt .............. G04G 11/00 368/109

(Continued)

OTHER PUBLICATIONS

U.S. Appl. No. 17/730,848, filed Apr. 27, 2022.
Ellis, Declaration of David W. Ellis, dated May 27, 2023 (19 pages).

*Primary Examiner* — Eric J Rosen
*Assistant Examiner* — Robert C Moore
(74) *Attorney, Agent, or Firm* — Christopher G. Darrow; Darrow Mustafa PC

(57) ABSTRACT

A retainer installation tool can facilitate installation of a retainer onto a vehicle body structure. In some arrangements, the retainer can be for a vehicle sonar sensor, and the vehicle body structure can be a bumper. The retainer installation tool can help to ensure proper placement of retainer, sufficient adhesion time, and/or placement of an adhesive. The retainer installation tool can include an outer casing. The retainer installation tool can include a central shaft extending partially within the outer casing. The retainer installation tool can include a handle operatively connected to cause rotation of the central shaft. The retainer installation tool can be configured to retainably engage a retainer. The retainer installation tool can be configured to selectively disengage the retainer when the central shaft is rotated.

18 Claims, 7 Drawing Sheets

(56) References Cited

U.S. PATENT DOCUMENTS

| | | | | |
|---|---|---|---|---|
| 2016/0059424 | A1 | 3/2016 | Zachary et al. | |
| 2016/0303720 | A1 | 10/2016 | Lambert | |
| 2020/0324377 | A1* | 10/2020 | Mayes | F02M 55/004 |
| 2021/0060746 | A1* | 3/2021 | Marxkors | B25B 23/141 |
| 2022/0341702 | A1* | 10/2022 | Owens | F41A 17/066 |

* cited by examiner

RETAINER INSTALLATION TOOL

FIELD

The subject matter described herein relates in general to retainers and, more particularly, to tools for facilitating the installation of retainer.

BACKGROUND

A vehicle can include one or more sensors for detecting a portion of the external environment of the vehicle. For instance, the vehicle can include a sonar sensor. The sonar sensors can sense objects in the external environment using sound waves. Such a sensor can be used to detect objects in the external environment of the vehicle for safety purposes. The sonar sensor is typically connected to a vehicle body structure, such as a bumper, by a retainer.

SUMMARY

In one respect, the present disclosure is directed to a retainer installation tool. The retainer installation tool can include an outer casing. The retainer installation tool can include a central shaft extending partially within the outer casing. The retainer installation tool can include a handle operatively connected to cause rotation of the central shaft. The retainer installation tool can be configured to selectively retainably engage a retainer. The retainer installation tool can be configured to selectively disengage the retainer when the central shaft is rotated.

In another respect, the present disclosure is directed to a retainer installation tool. The retainer installation tool can include an outer casing. The retainer installation tool can include a central shaft extending partially within the outer casing. The central shaft can include one or more gear segments. The retainer installation tool can include a handle. The handle can be operatively connected to the central shaft by one or more gear tracks. The one or more gear tracks can engage the one or more gear segments on the central shaft. When the handle is engaged, the one or more gear tracks can move to cause rotation of the central shaft by enmeshing engagement with the one or more gear segments on the central shaft. The retainer installation tool can include a locking protrusion. The locking protrusion can be configured to retainably engage a retainer on the retainer installation tool. The retainer installation tool can be configured to selectively disengage the retainer when the central shaft is rotated; thus, the retainer is free to be separated from the retainer installation tool.

DETAILED DESCRIPTION

Figure 1:
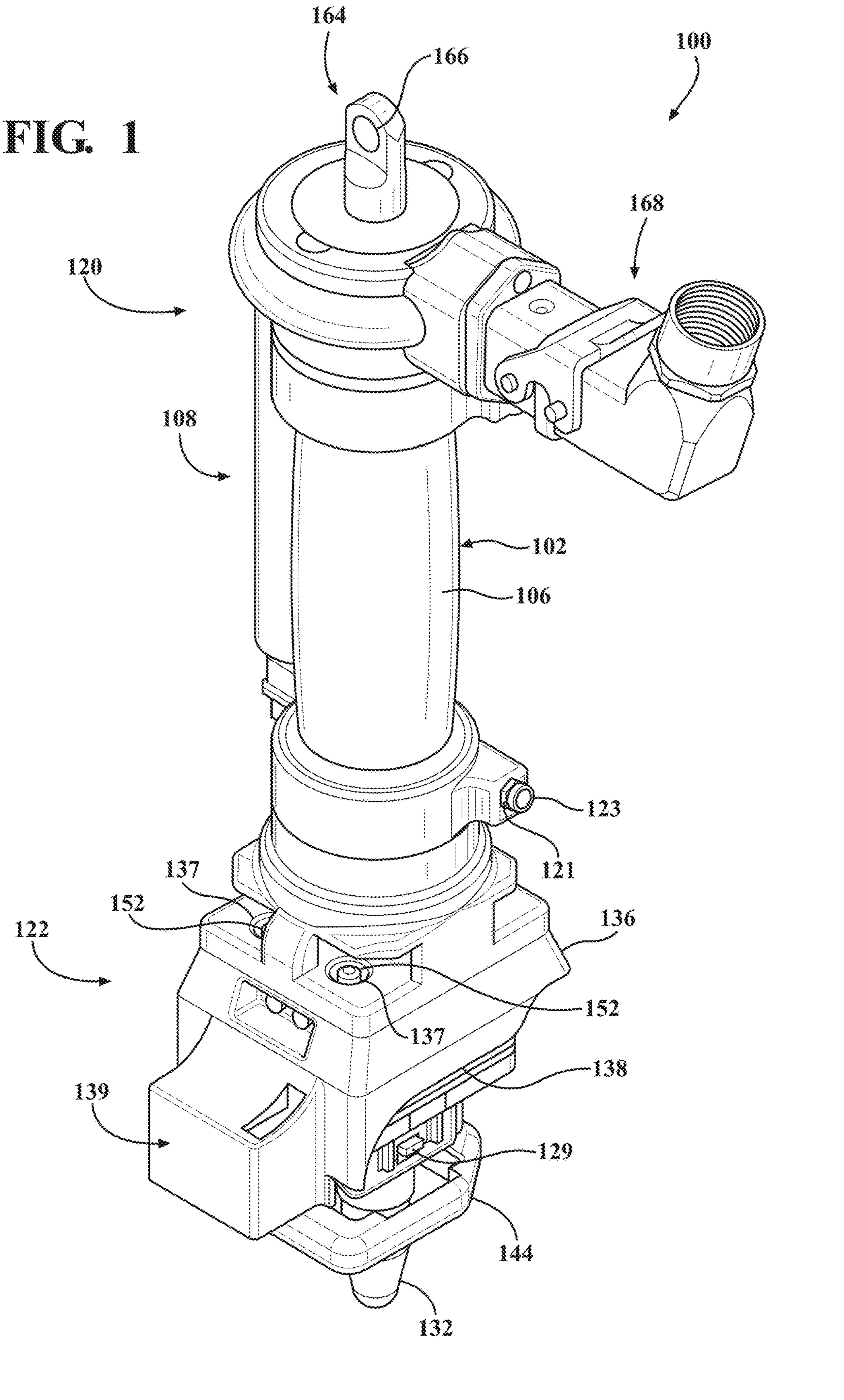
FIG. 1 is an example of a retainer installation tool.

When a sensor retainer is installed into a vehicle body structure, care must be taken to ensure proper placement of retainer, sufficient adhesion time, and/or placement of an adhesive. Failure to do so can result in broken retainers that are unable to hold the sensor or insufficient adhesion resulting in the retainer being prone to separate from the vehicle body structure.

According to arrangements herein, a retainer installation tool can be provided to facilitate installation of a retainer into a vehicle body structure. The retainer installation tool can help to ensure proper placement of retainer, sufficient adhesion time, and/or placement of an adhesive and/or adhesion promoter. The retainer installation tool can include a central shaft extending partially within the outer casing. The retainer installation tool can include a handle operatively connected to cause rotation of the central shaft. The retainer installation tool can be configured to selectively retainably engage a retainer. The retainer installation tool can be configured to selectively disengage the retainer when the central shaft is rotated.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1-5, an example of a retainer installation tool 100 is shown. The retainer installation tool 100 can be configured to facilitate proper installation of a retainer. The retainer can be any type of retainer and for any suitable purpose. In one or more arrangements, the retainer installation tool 100 can be used in connection with a retainer for holding a sonar sensor of a vehicle.

The retainer installation tool 100 can include an outer casing 102. The outer casing 102 can have any suitable size, shape, and/or configuration. In one or more arrangements, the outer casing 102 can be substantially cylindrical in conformation. In one or more arrangements, at least a portion of the outer casing 102 can be hollow. The outer casing 102 can have an inner peripheral surface 104 and an outer peripheral surface 106. The outer casing 102 can be made of any suitable material, such as metal or plastic.

The retainer installation tool 100 can include a handle 108. The handle 108 can have any suitable size, shape, and/or configuration. In one or more arrangements, the handle 108 can be substantially cylindrical in conformation.

In one or more arrangements, the handle 108 can extend substantially parallel to the outer casing 102. The handle 108 can be made of a soft material for comfortable engagement by a user. In some arrangements, the handle 108 can include one or more ergonomic features and/or configurations.

Figure 3:
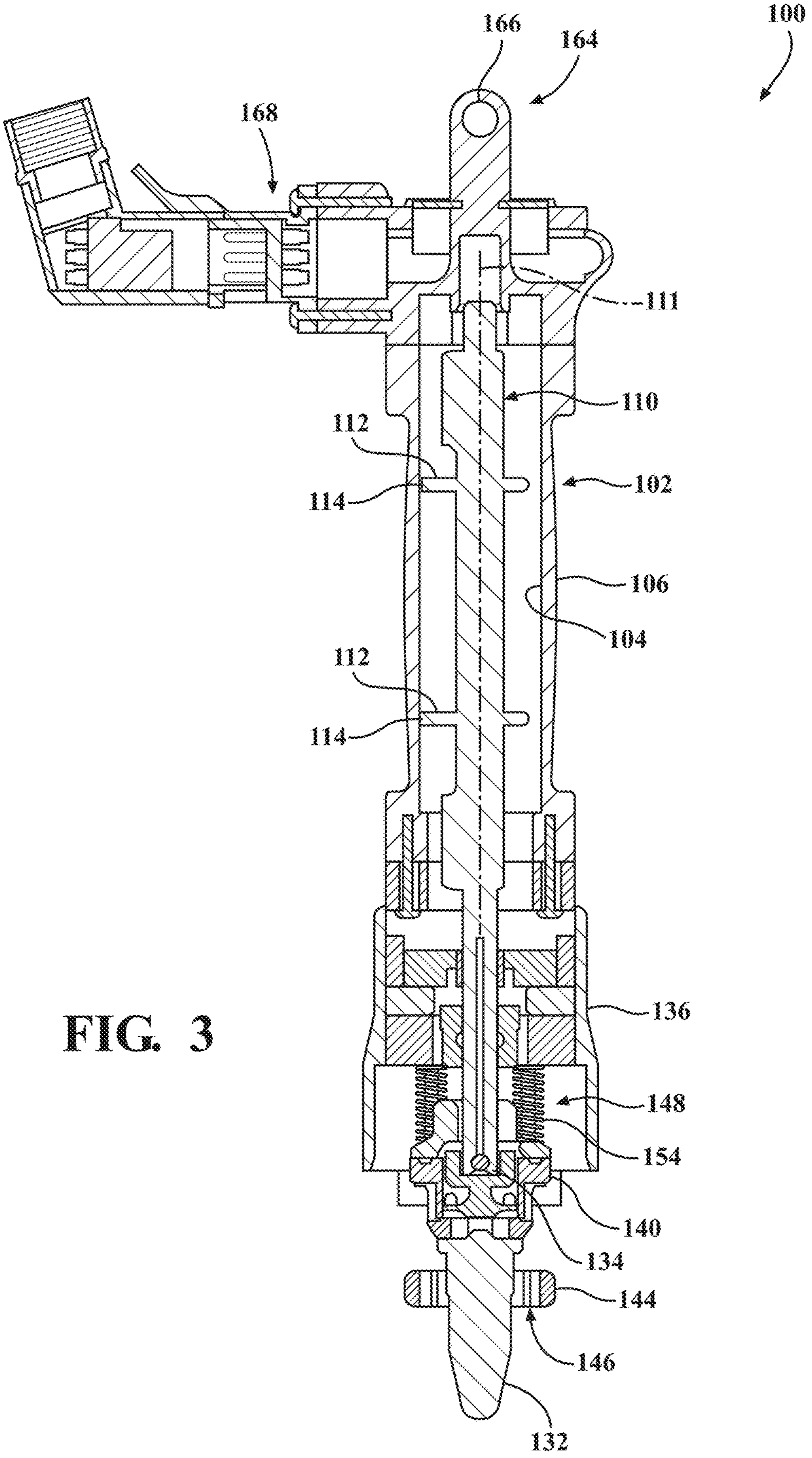
FIG. 3 is a cross-sectional view of the retainer installation tool.

The retainer installation tool 100 can include a central shaft 110. The central shaft 110 can have any suitable size, shape, and/or configuration. In one or more arrangements, the central shaft 110 can be substantially cylindrical in conformation. The central shaft 110 can be made of any suitable material, such as metal or plastic. The central shaft 110 can have an axis of rotation 111 (FIG. 3).

The central shaft 110 can be located within the outer casing 102. In one or more arrangements, the central shaft 110 can be configured to include one or more features to keep the central shaft 110 substantially centered within the outer casing 102. As an example, the central shaft 110 can include one or more spacers 112. In the arrangements shown, the central shaft 110 can have two spacers 112. The spacers 112 can be spaced apart along the axis of rotation 111. In some arrangements, the spacer(s) 112 can include an outer rim 114. The spacer(s) 112 can be configured so that at least a portion of the outer rim 114 of the spacer(s) 112 directly contacts or is substantially adjacent to the inner peripheral surface 104 of the outer casing 102. Thus, the spacer(s) 112 can help to keep the central shaft 110 substantially centered within the outer casing 102.

The spacer(s) 112 can be a unitary structure with the central shaft 110. Alternatively, the spacer(s) 112 can be a separate structure that is operatively connected to the central shaft 110. The spacer(s) 112 can have any suitable configuration. In one or more arrangements, the spacer(s) 112 can be substantially circular. In some arrangements, the spacer(s) 112 can be cam-like with an unequal diameter about the axis of rotation 111.

The handle 108 can be operatively connected to cause rotation of the central shaft 110. Any suitable form of operative connection can be provided. For example, the retainer installation tool 100 can include one or more gear tracks 116. The gear track(s) 116 can be operatively connected to the handle 108. The gear track(s) 116 can extend from the handle 108. In one or more arrangements, the gear track(s) 116 can extend at substantially 90 degrees relative to the handle 108.

The gear track(s) 116 can extend into the outer casing 102 and into engagement with the central shaft 110. In some arrangements, the central shaft 110 can include one or more features for engaging with the gear track(s) 116. As an example, the central shaft 110 can include one or more gear segment(s) 118. The gear segment(s) 118 can include gear teeth for enmeshing engagement with gear teeth provided on the gear track(s) 116. In some arrangements, the gear segment(s) 118 can extend substantially one quarter or more of the circumference the central shaft 110.

Figure 5:
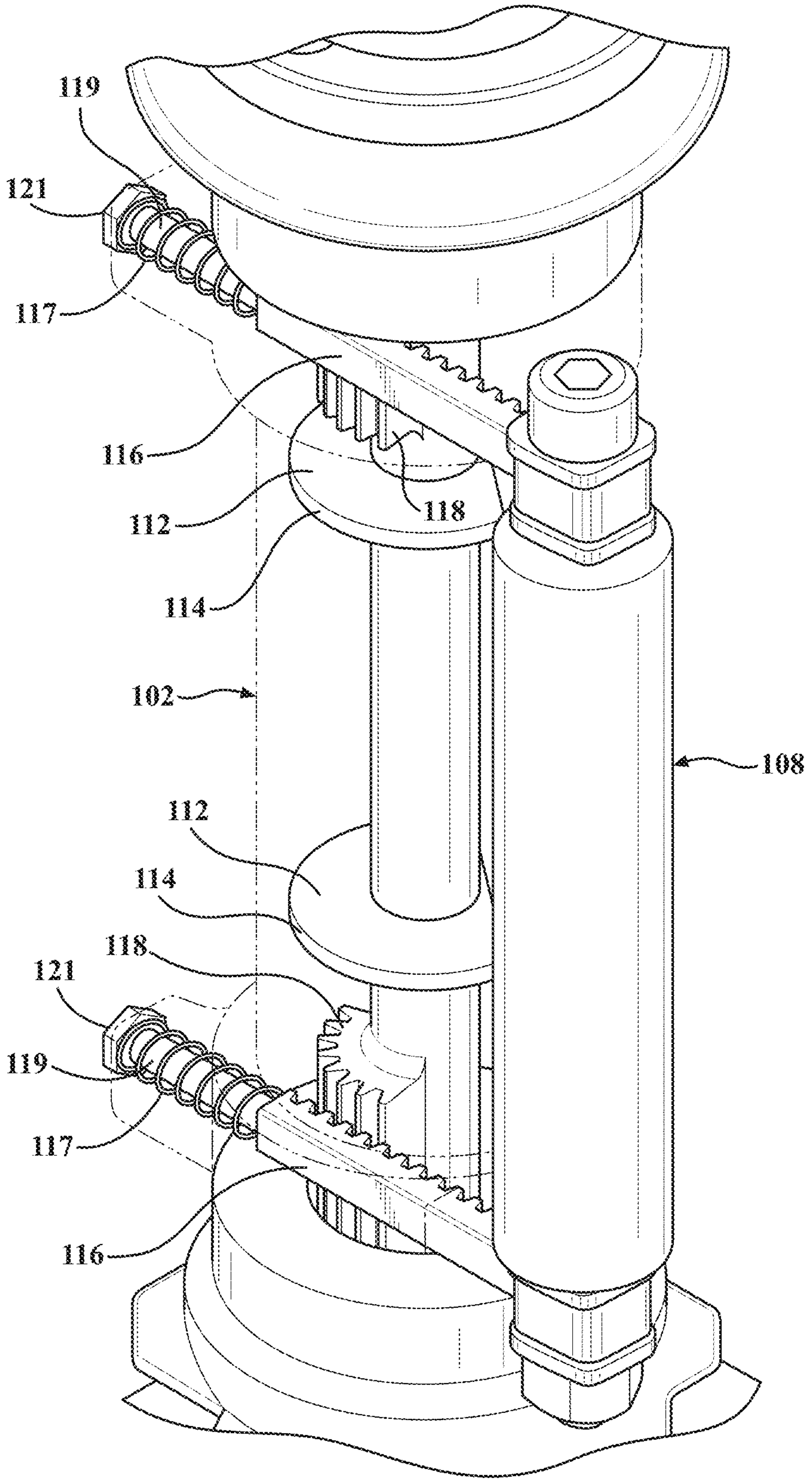
FIG. 5 is a view of a portion of the retainer installation tool.

The gear track(s) 116 can be biased into a non-activated position. To that end, there can be one or more biasing members associated with the gear track(s) 116. For instance, the biasing members can include one or more springs 117, such as is shown in FIG. 5 (several structures are shown in phantom lines to enable the structures within to be seen). The spring(s) 117 can be provided on one or more rods 119, which can be fixed in position. The gear track(s) 116 can be configured to receive a portion of a respective one of the rods 119 as the handle 108 is moved. The rods 119 can be fixed to the outer casing 102 by, for example one or more fasteners (e.g., nuts 121 and screw 123 (FIG. 1)). Thus, when the handle 108 is released, the gear track(s) 116 can be biased to return to their non-activated position by the spring(s) 117.

The central shaft 110 can have an upper region 120 and a lower region 122. The terms "upper" and "lower" are used for convenience to facilitate the discussion with respect to the orientation of the central shaft 110 in FIG. 1. It will be appreciated that, in actual use, the retainer installation tool 100 may be oriented such that the upper region 120 is located below the lower region 122.

One or more elements can be operatively connected to the central shaft 110 near the lower region 122. For instance, a cam disk 124 can be operatively connected to the central shaft 110 such that, as the central shaft 110 rotates, the cam disk 124 rotates with the central shaft 110. Any suitable form of operative connection between the cam disk 124 and the central shaft 110 can be used, including, for example, one or more fasteners, one or more adhesives, one or more forms of mechanical engagement, or any combination thereof, just to name a few possibilities. In some arrangements, the cam disk 124 and the central shaft 110 can be formed together as a unitary structure.

The cam disk 124 can cause one or more protrusions to extend into locking engagement with a retainer. Rotation of the cam disk 124 can cause the one or more protrusions to retract so release the retainer from the retainer installation tool 100. The cam disk 124 can include one or more slots 126. In the arrangements shown in FIG. 4, the cam disk 124 can have two slots 126. The slots 126 can be generally arcuate extending about the cam disk 124 (or about the axis of rotation 111 of the central shaft 110).

Figure 4:
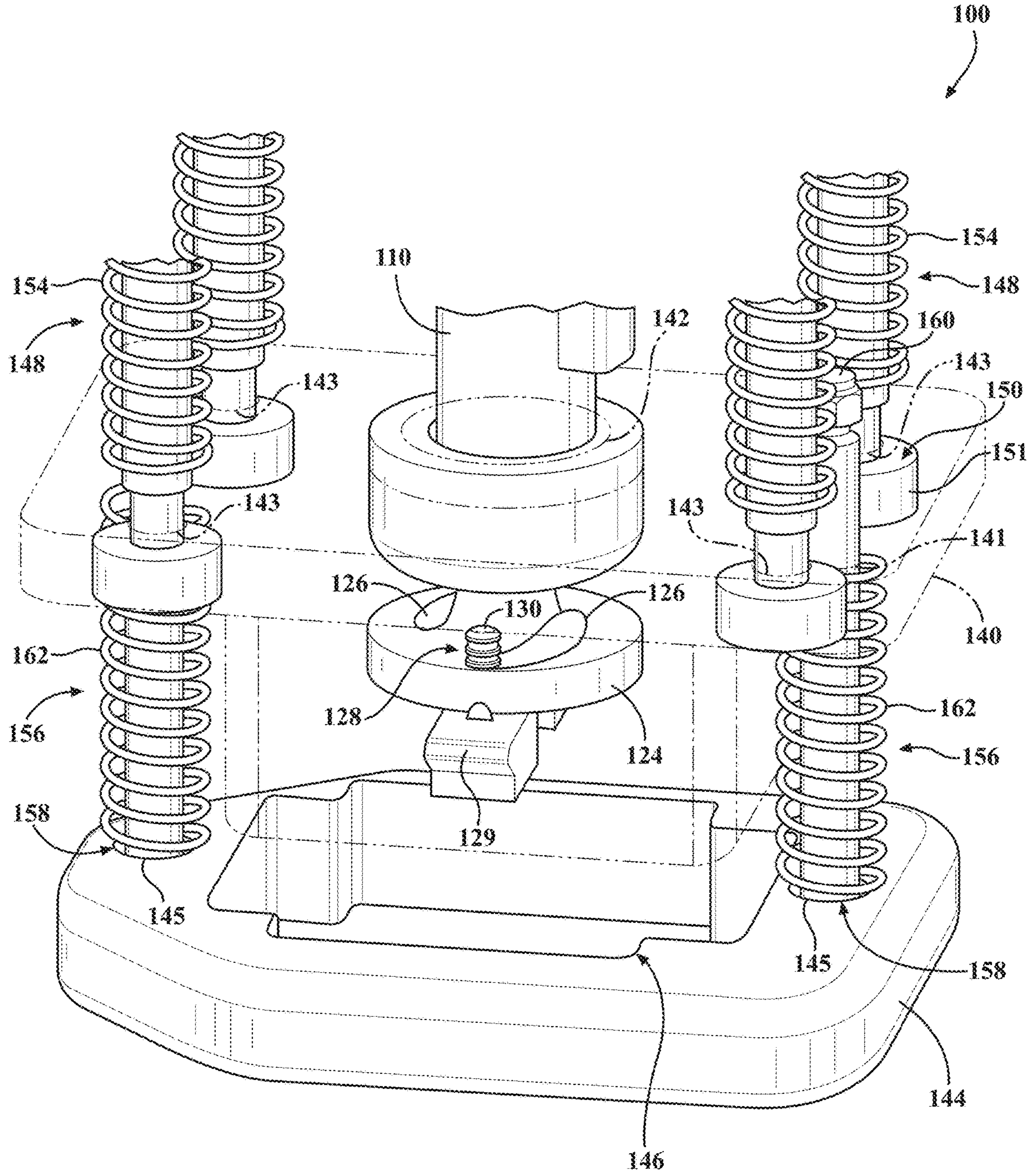
FIG. 4 is a view of a portion of the retainer installation tool.

A follower 128 can be received in one of the slots. At least a portion of the follower 128 can be configured to be received in a portion of a retainer. For instance, the follower 128 can include a locking protrusion 129. A portion of the follower 128, such as a pin 130, can be received in one of the slots 126 of the cam disk 124. While FIG. 4 shows one follower 128, it will be appreciated that there can be another follower on the other side of the cam disk 124, which is not visible in FIG. 4.

When the central shaft 110 rotates, the cam disk 124 rotates with the central shaft 110. Eventually, the pin 130 will reach the end of the slot 126. As the cam disk 124 rotates further, the rotation of the cam disk 124 can pull the follower 128 with it. The locking protrusion 129 of the follower 128 can be pulled out of engagement with the retainer so as to release the retainer. As a result, the retainer can be separated from the retainer installation tool 100.

The lower region 122 can also include a locating nose 132. The locating nose 132 can be operatively connected to a distal end 134 (FIG. 3) of the central shaft 110. The locating nose 132 can have any suitable shape. For instance, the locating nose 132 can be substantially conic, substantially spherically blunted conic, substantially bi-conic, substantially tangent ogive, substantially spherically blunted tangent ogive substantially secant ogive, substantially elliptical, substantially parabolic, substantially cylindrical, just to name a few possibilities. The locating nose 132 can be sized, shaped, and/or configured to pass through a retainer and be received in an aperture in a workpiece on which the retainer will be installed. The locating nose 132 can help to center the retainer installation tool 100 (and the retainer) on the aperture in the workpiece.

The lower region 122 can include a lower body member 136. The lower body member 136 can have any suitable size, shape, and/or configuration. In some arrangements, a portion of the lower body member 136 can have one or more part engaging surfaces 138. The part engaging surface(s) 138 can be contoured to substantially matingly engage a workpiece on which the retainer will be installed and/or other structure near the work piece. For instance, the workpiece can be a vehicle bumper, and the part engaging surface(s) 138 can follow a bumper profile contour.

The lower body member 136 can include a plurality of apertures 137 (FIG. 1). The apertures 137 can have any suitable size, shape, and/or configuration. In one or more arrangements, the apertures 137 can be substantially circular in cross-sectional shape. As will be explained herein, the apertures 137 can receive a fastener and allow movement of the fastener therein. The lower body member 136 can include a side enclosure portion 139. The side enclosure portion 139 can at least partially house one or more components of the retainer installation tool 100, such as light source(s) 640 and light detector(s) 645.

Figure 2:
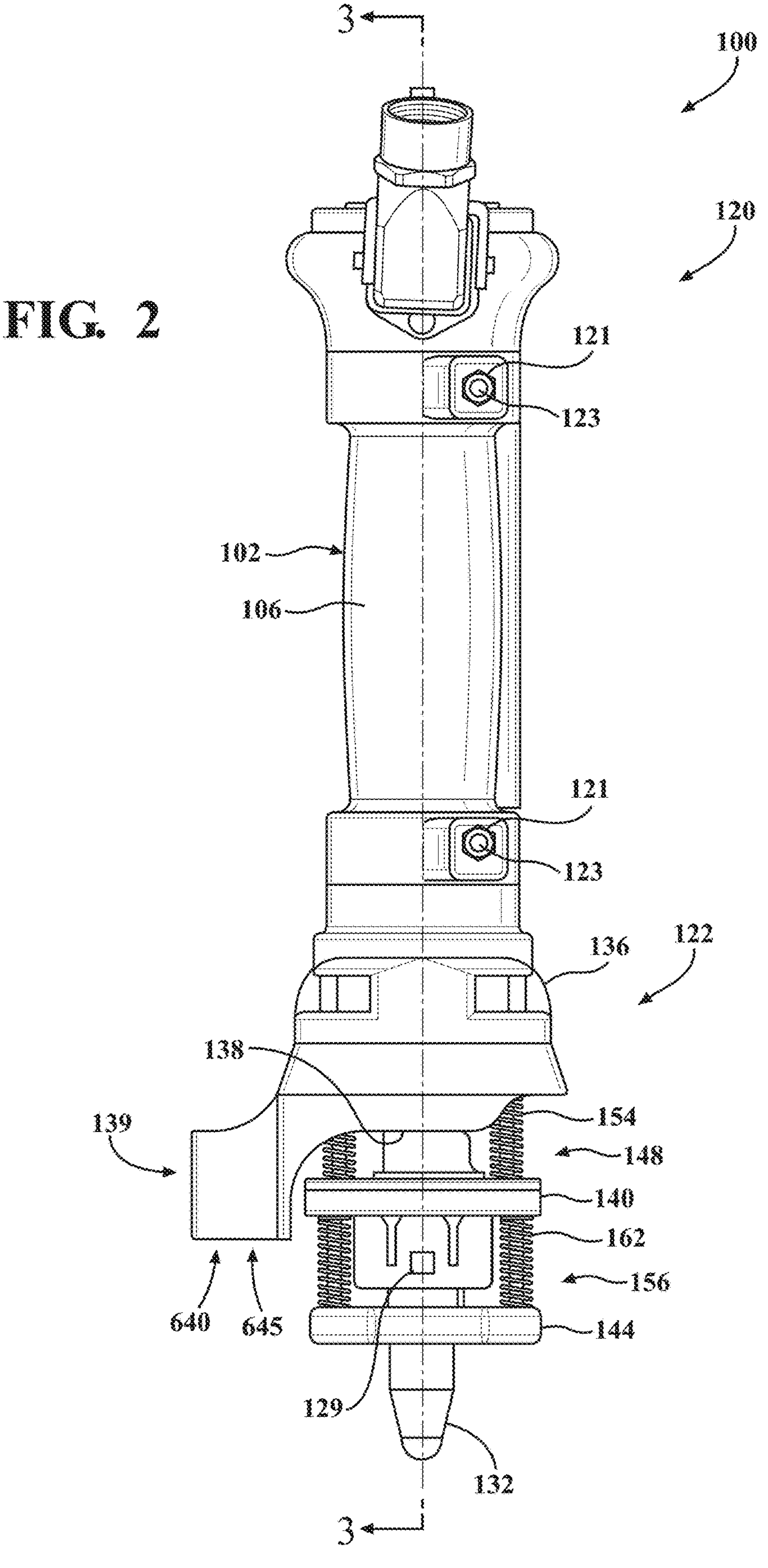
FIG. 2 is a view of the retainer installation tool.

The lower region 122 can include a platform 140, as is shown in FIG. 2. The platform 140 can have any suitable size, shape, and/or configuration. The platform 140 can be made of any suitable material. In one or more arrangements, the platform 140 can include a central aperture 142 (FIG. 4). The central shaft 110 can pass through the central aperture 142 of the platform 140.

The platform 140 can include a plurality of apertures, including aperture(s) 141 and aperture(s) 143. The apertures 141, 143 can have any suitable size, shape, and/or configuration. In one or more arrangements, the apertures 141, 143 can be substantially circular in cross-sectional shape. As will be explained herein, the apertures 141, 143 can receive a fastener and allow movement of the fastener therein. In one or more arrangements, the apertures 143 in the platform 140 can be substantially aligned with the apertures 137 in the lower body member 136, and the apertures 141 in the platform 140 can be offset from the apertures 137 in the lower body member 136.

The lower region 122 can include a push ring 144. The push ring 144 can be configured to form a closed shape or a substantially closed shape. The push ring 144 can have any suitable size, shape, and/or configuration. In one or more arrangements, the push ring 144 can be substantially rectangular or substantially polygonal in shape. The push ring 144 can be custom configured to fit into the tight geometry of a retainer.

The push ring 144 can be made of any suitable material. In one or more arrangements, the push ring 144 can include a central aperture 146. The central shaft 110 can pass through the central aperture 146 of the push ring 144. The central aperture 146 can be sized, shaped, and/or configured to receive a retainer. The push ring 144 can include a plurality of apertures 145. A fastener can be received in the each of the apertures 145.

The retainer installation tool 100 can include a first plurality of fasteners 148. The first plurality of fasteners 148 can extend between the lower body member 136 and the platform 140. The first plurality of fasteners 148 can extend substantially parallel to the axis of rotation 111.

The first plurality of fasteners 148 can include a first end 150 (FIG. 4) and a second end 152 (FIG. 1). The first end 150 of the first plurality of fasteners 148 can be fixed to the platform 140, such as by one or more fasteners, one or more forms of mechanical engagement, one or more welds, one or more brazes, one or more forms of adhesives, or any combination thereof, just to name a few possibilities. A portion of the first plurality of fasteners 148 can be received in the apertures 143 in the platform 140. The first plurality of fasteners 148 can be substantially fixed within the apertures 143, such as by one or more fasteners (e.g., screws 151 in FIG. 4). The first plurality of fasteners 148 can also be received in respective apertures 137 in the lower body member 136. The first plurality of fasteners 148 can be free to move axially within the apertures 137. As a result of these arrangements, relative movement between the lower body member 136 and the platform 140 can be permitted. The second end 152 of the first plurality of fasteners 148 may not be fixed to another structure and, thus, can be free to move.

The first plurality of fasteners 148 can be any type of fastener. In one or more arrangements, the first plurality of fasteners 148 can be pins, rods, bolts, screws, or other type of fastener. The first plurality of fasteners 148 can be substantially identical to each other, or one or more of the first plurality of fasteners 148 can be different from the other fasteners in one or more respects.

The first plurality of fasteners 148 can include any quantity of fasteners. While FIG. 4, shows the first plurality of fasteners 148 as having four fasteners, it will be appreciated that there can be more fasteners or fewer fasteners. Further, the first plurality of fasteners 148 can include one or more biasing members, such as springs 154, for biasing the lower body member 136 and/or the platform 140 to a non-compressed position. Each of the first plurality of fasteners 148 can pass through a respective one of the springs 154.

The retainer installation tool 100 can include a second plurality of fasteners 156. The second plurality of fasteners 156 can extend between the platform 140 and the push ring 144. The second plurality of fasteners 156 can extend substantially parallel to the axis of rotation 111.

The second plurality of fasteners 156 can include a first end 158 and a second end 160, as shown in FIG. 4. The first end 158 of the second plurality of fasteners 156 can be fixed to the push ring 144, such as by one or more fasteners, one or more forms of mechanical engagement, one or more welds, one or more brazes, one or more forms of adhesives, or any combination thereof, just to name a few possibilities. A portion of the second plurality of fasteners 156 can be received in the apertures 145 in the push ring 144.

The second plurality of fasteners 156 can be substantially fixed within the apertures 145 (FIG. 4). The second plurality of fasteners 156 can also be received in respective apertures 141 in the platform 140. The second plurality of fasteners 156 can be free to move axially within the apertures 141. As a result of these arrangements, relative movement between the push ring 144 and the platform 140 can be permitted. The second end 160 of the second plurality of fasteners 156 may not be fixed to another structure and, thus, can be free to move.

The second plurality of fasteners 156 can be any type of fastener. In one or more arrangements, the second plurality of fasteners 156 can be pins, rods, bolts, screws, or other type of fastener. The second plurality of fasteners 156 can be substantially identical to each other, or one or more of the second plurality of fasteners 156 can be different from the other fasteners in one or more respects.

The second plurality of fasteners 156 can include any quantity of fasteners. While FIG. 4 shows the second plurality of fasteners 156 as having two fasteners, it will be appreciated that there can be more fasteners. Further, the second plurality of fasteners 156 can include one or more biasing members, such as springs 162, for biasing the platform 140 and the push ring 144 to a non-compressed position. Each of the second plurality of fasteners 156 can pass through a respective one of the springs 162.

The retainer installation tool 100 can be configured to selectively retainably engage a retainer. The retainer installation tool 100 can be configured to selectively disengage the retainer, such as by rotating the central shaft 110, as will be explained further herein.

It will be appreciated that the retainer installation tool 100 can be used to install different types of retainers into different types of parts. To that end, the retainer installation tool 100 can be configured to allow different application heads can be used depending on the type of retainer being installed and/or the part into which the retainer is being installed and/or other nearby structures. The application heads of the retainer installation tool 100 can include the lower body member 136, the platform 140, the push ring 144, and/or other components of the retainer installation tool 100.

As will be further explained herein, the retainer installation tool 100 can include one or more light sources 640 and one or more light detectors 645. In some arrangements, the light source(s) 640 and the light detector(s) 645 can be located within a portion of the lower body member 136, such as in the side enclosure portion 139. Further, the retainer installation tool 100 can include one or more timers 670 (see FIG. 6). The one or more timers 670 can be used for various purposes. For instance, the timer(s) 670 can be used to count from an event. For example, the event can be when the retainer installation tool 100 presses a retainer into or onto a receiving part with sufficient pressure or force. The timer(s) 670 can begin counting to ensure a sufficient curing time or setting time of any adhesives used in the installation process.

The retainer installation tool 100 can include one or more features for connection to another structure or item. For instance, the retainer installation tool 100 can include one or more features for connection to a tool balancer. To this end, the upper region 120 of the retainer installation tool 100 can include a stem 164 with an aperture 166. A clip, carabiner, hook, loop, cable, or other structure can pass through or be received in the aperture 166 for connection to a tool balancer. The tool balancer can make the tool "weightless" to an operator. Also, the tool balancer can prevent the retainer installation tool from being dropped, thereby preventing damage to the retainer installation tool and/or workers. Of course, it will be appreciated that the aperture 166 can be used to connect the retainer installation tool 100 to other structures.

The retainer installation tool 100 can include an electrical quick connect/disconnect 168. The electrical quick connect/disconnect 168 can be any type of electrical quick connect/disconnect, now known or later developed. In some arrangements, the electrical quick connect/disconnect 168 can include latching power connectors. Thus, the retainer installation tool 100 can be readily connected and/or disconnected to a power source.

Figure 6:
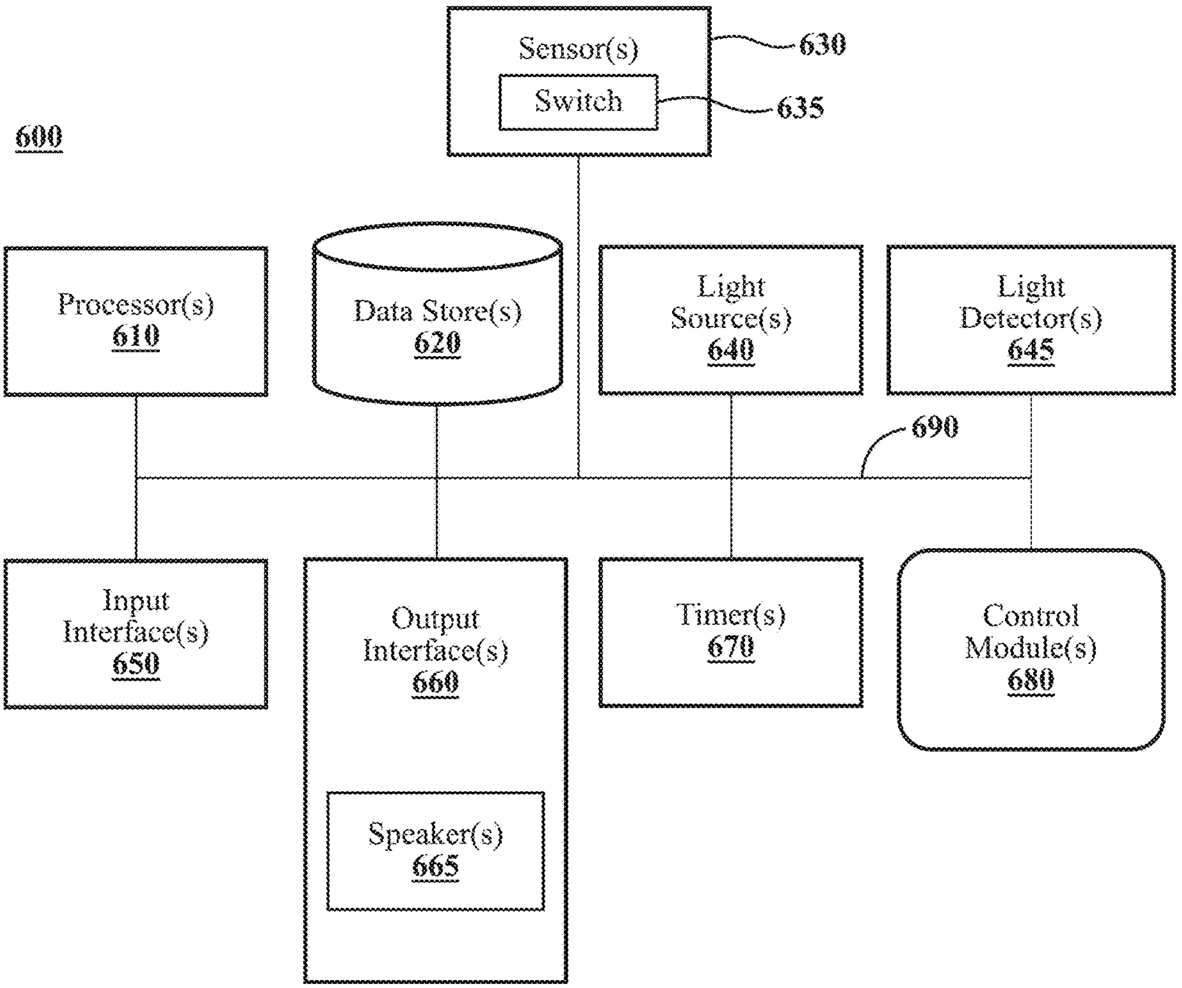
FIG. 6 is an example of a system for the retainer installation tool.

The retainer installation tool 100 can include a system 600. The system 600 can have various elements. Some of the possible elements of the system 600 are shown in FIG. 6 and will now be described. It will be understood that it is not necessary for the system 600 to have all of the elements shown in FIG. 6 or described herein. The system 600 can have any combination of the various elements shown in FIG. 6. Further, the system 600 can have additional elements to those shown in FIG. 6. In some arrangements, the system 600 may not include one or more of the elements shown in FIG. 6. Further, the elements shown may be physically separated by large distances. Indeed, one or more of the elements can be located remote from retainer installation tool 100. Some of the elements can be components of the retainer installation tool 100 while some of the elements may not be components of the retainer installation tool 100.

The system 600 can include one or more processors 610, one or more data stores 620, one or more sensors 630, one or more light sources 640, one or more light detectors 645, one or more input interfaces 650, one or more output interfaces 660, one or more timers 670, and one or more control modules 680. Each of these elements will be described in turn below.

The various elements of the system 600 can be communicatively linked through one or more communication networks 690. As used herein, the term "communicatively linked" can include direct or indirect connections through a communication channel or pathway or another component or system. A "communication network" means one or more components designed to transmit and/or receive information from one source to another. The communication network(s) 690 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 690 further can be implemented as or include one or more wireless networks, whether short or long range. For example, in terms of short-range wireless networks, the communication network(s) 690 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 690 can include a mobile, cellular, and or satellite-based wireless network and support voice, video, text, and/or any combination thereof. Examples of long-range wireless networks can include GSM, TDMA, CDMA, WCDMA networks or the like. The communication network(s) 690 can include wired communication links and/or wireless communication links. The communication network(s) 690 can include any combination of the above networks and/or other types of networks. The communication network(s) 690 can include one or more routers, switches, access points, wireless access points, and/or the like.

One or more elements of the system 600 include and/or can execute suitable communication software, which enables two or more of the elements to communicate with each other through the communication network(s) 690 and perform the functions disclosed herein.

As noted above, the system 600 can include one or more processors 610. "Processor" means any component or group of components that are configured to execute any of the processes described herein or any form of instructions to carry out such processes or cause such processes to be performed. The processor(s) 610 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 610 can include at least one hardware circuit (e.g., an integrated circuit) configured to carry out instructions contained in program code. In arrangements in which there is a plurality of processors 610, such processors can work independently from each other, or one or more processors can work in combination with each other.

The system 600 can include one or more data stores 620 for storing one or more types of data. The data store(s) 620 can include volatile and/or non-volatile memory. Examples of suitable data stores 620 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 620 can be a component of the processor(s) 610, or the data store(s) 620 can be operatively connected to the processor(s) 610 for use thereby. The term "operatively connected," as used throughout this description, can include direct or indirect connections, including connections without direct physical contact.

The system 600 can include one or more sensors 630. "Sensor" means any device, component and/or system that can detect, determine, assess, monitor, measure, quantify and/or sense something. The sensor(s) 630 can detect, determine, assess, monitor, measure, quantify and/or sense in real-time. As used herein, the term "real-time" means a level of processing responsiveness that a user, entity, component, and/or system senses as sufficiently immediate for a particular process or determination to be made, or that enables a processor to process data at substantially the same rate as some external process or faster.

In arrangements in which there are a plurality of sensors 630, the sensors 630 can work independently from each other. Alternatively, two or more of the sensors 630 can work in combination with each other. In such case, the two or more sensors 630 can form a sensor network. The sensor(s) 630 can be operatively connected to the processor(s) 610, the data store(s) 620, and/or other element of the system 600 (including any of the elements shown in FIG. 6).

The sensor(s) 630 can include any suitable type of sensor. For instance, the sensor(s) 630 can include one or more sensors configured to detect, measure, or acquire data about when the retainer installation tool 100 is engaging a work piece. For instance, the sensor(s) 630 can detect the location of the retainer installation tool 100 relative to a work piece (e.g., a vehicle bumper). Ins some arrangements, the sensor(s) 630 can be configured to detect when the retainer installation tool 100 is contacting a work piece. The sensor(s) 630 can include proximity sensors, pressure sensors, positional sensors, a combination thereof, or the like.

In some arrangements, the sensor(s) 630 can include a switch 635. The switch 635 can be any suitable type of switch, now known or later developed. For example, the switch 635 can be a snap-acting switch.

In some arrangements, when the retainer installation tool 100 is sufficiently compressed and/or a sufficient amount of downward pressure or force is applied on the retainer installation tool 100, the switch 635 can be physically engaged by one or more structures of the retainer installation tool 100 and/or the workpiece. In one or more arrangements, the switch 635 can be located on the platform 140. The switch 635 can be activated when the lower body member 136 contacts the switch 635. The engagement of the switch 635 can cause one or more timers to be activated, as will be explained herein.

The system 600 can include one or more light sources 640. The light source(s) 640 can be operatively positioned to emit light toward a work area of the retainer installation tool 100. The light source(s) 640 can be configured to emit any suitable type of light. For example, in one or more arrangements, the light source(s) 640 can emit ultraviolet light. In other arrangements, the light source(s) 640 can be configured to emit polychromatic, visible light, infrared light, or light from any region of the electromagnetic spectrum.

The system 600 can include one or more light detectors 645. The light detector(s) 645 can be operatively positioned to detect one or more properties of the light after the light has interacted a work area. For example, the light detector(s) 645 can be configured to detect one or more light signatures after the light has interacted with the work area. More particularly, the light detector(s) 645 can be configured to detect one or more light signatures after the light has interacted with an adhesive on the work area. The light detector(s) 645 can be any suitable type of light detector(s). For example, the light detector(s) 645 can be spectrometer(s) or detector(s) having multiple spectral filters.

The light detector(s) 645 can be operatively positioned to detect a light signature from the work area. In one or more arrangements, an adhesive (e.g., retainer primer glue) and/or adhesion promoter can include a substance, material, or particles to make it reflective. For instance, the adhesive and/or adhesion promoter can include an ultraviolet reflective substance, material, or particles. Thus, when an ultraviolet light is shined on it, the adhesive will reflect. The light detector(s) 645 can be located in the side enclosure portion 139 of the retainer installation tool 100. The light detector(s) 645 can scan for a light signature (e.g., ultraviolet reflectivity) of the adhesive and/or adhesive promoter.

The system 600 can include one or more input interfaces 650. An "input interface" includes any device, component, system, element or arrangement or groups thereof that enable information/data to be entered into a machine. The input interface(s) 650 can receive an input from a user (e.g., a person) or other entity. Any suitable input interface(s) 650 can be used, including, for example, a keypad, display, touch screen, multi-touch screen, button, joystick, mouse, trackball, microphone, gesture recognition, and/or combinations thereof.

The system 600 can include one or more output interfaces 660. An "output interface" includes any device, component, system, element or arrangement or groups thereof that enable information/data to be presented to a user (e.g., a person) or other entity. The output interface(s) 660 can present information/data to a user or other entity. The output interface(s) 660 can include a display, an earphone, a haptic device, a projector, and/or speaker 665. Examples of speakers 665 include, for example, electroacoustic transducers, sound chips, and sound cards. Some components of the system 600 may serve as both a component of the input interface(s) 650 and a component of the output interface(s) 660.

The system 600 can include one or more timers 670. The timer(s) 670 can be any suitable timer, now known or later developed. The timer(s) 670 can be configured to count up or down from an event or starting point. For example, the event can be when the switch 635 is activated. In such case, a signal can be sent to activate the timer(s) 670.

The system 600 can include one or more modules, at least some of which will be described herein. The modules can be implemented as computer readable program code that, when executed by a processor, implement one or more of the various processes described herein. One or more of the modules can be a component of the processor(s) 610, or one or more of the modules can be executed on and/or distributed among other processing systems to which the processor(s) 610 is operatively connected. The modules can include instructions (e.g., program logic) executable by one or more processor(s) 610. Alternatively or additionally, the data store(s) 620 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 600 can include one or more control modules 680. The control module(s) 680 can be configured to perform various functions with respect to the retainer installation tool 100.

For instance, the control module(s) 680 can be configured to receive input signals from the light detector(s) 645. If the input signal indicates that a light signature is present, the control module(s) 680 can be configured to take no action or otherwise enable the retainer installation tool 100 to operate. Alternatively or additionally, the control module(s) 680 can cause an indicator to be presented to an operator that it is ok to proceed with use of the retainer installation tool 100. For instance, the control module(s) 680 can be configured to cause the output interface(s) 660 to present a visual, audial, and/or haptic alert to a user.

If the input signal indicates that a light signature is not present, the control module(s) 680 can be configured to disable the retainer installation tool 100. As a result, a user will not be able to operate the retainer installation tool 100. Alternatively or additionally, the control module(s) 680 can cause an indicator to be presented to an operator that it is not ok to proceed with use of the retainer installation tool 100. For instance, the control module(s) 680 can be configured to cause the output interface(s) 660 to present a visual, audial, and/or haptic alert to a user.

Alternatively, the control module(s) 680 can be configured to analyze data received from the light detector(s) 645. Depending on whether the control module(s) 680 detects or does not detect a light signature in the data, then the control module(s) 680 can proceed as described above. In some arrangements, the control module(s) 680 can use light signature data store in the data store(s) 620 to compare to the received data from the light detector(s) 645.

For instance, the control module(s) 680 can be configured to receive input signals from the timer(s) 670 and/or the sensor(s) 630. If the input signal indicates that the retainer installation tool 100 has been in contact with a work piece for a sufficient period of time, the control module(s) 680 can cause an indicator to be presented to an operator that it is ok to proceed with separating a retainer from the retainer installation tool 100. For instance, the control module(s) 680 can be configured to cause the output interface(s) 660 to present a visual, audial, and/or haptic alert to a user.

Figure 8:
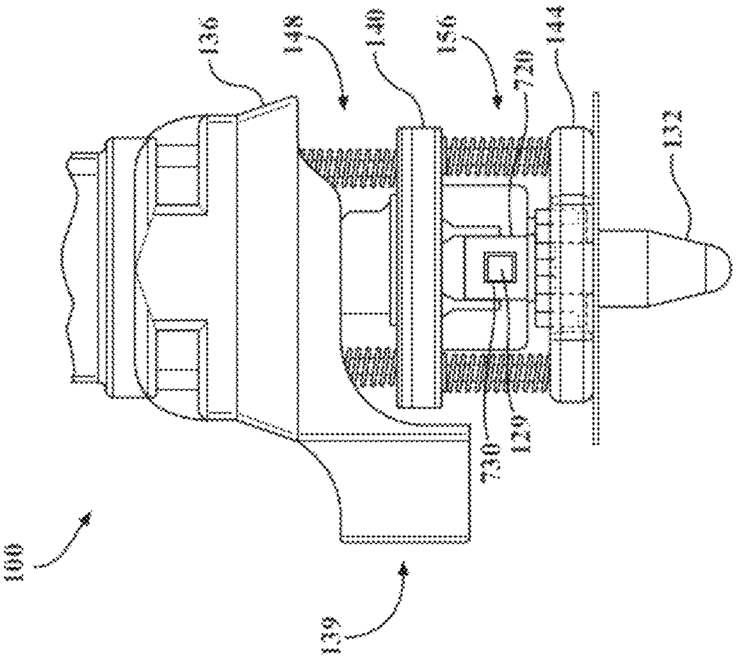
FIG. 8 is an example of the retainer installation tool retainably engaging the retainer.
Figure 7:
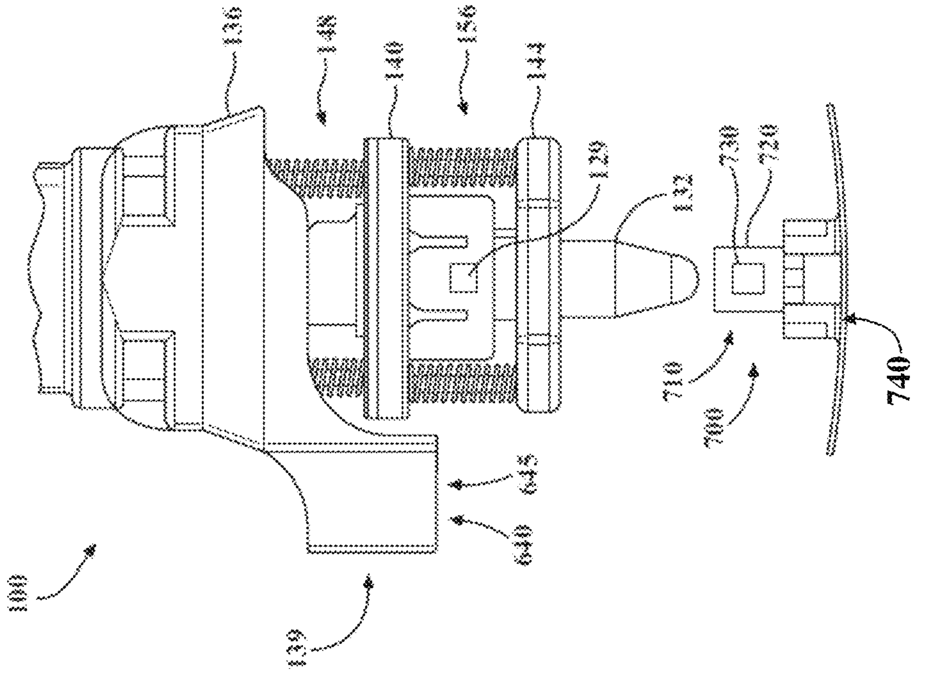
FIG. 7 is an example of the retainer installation tool and a retainer.

A non-limiting example of the operation of the arrangements described herein will now be presented in connection to FIGS. 7-8. Referring to FIG. 7, the retainer installation tool 100 and a retainer 700 are shown. To facilitate the discussion, only a lower portion of the retainer installation tool 100 is shown. The retainer 700 can have any suitable size, shape, and/or configuration. In this example, the retainer 700 can be for use with a sonar senor for a vehicle. The retainer 700 can include a sensor holder portion 710. The sensor holder portion 710 can include one or more flanges 720. Only one flange 720 is visible in FIG. 7. However, in some arrangements, there can be a second flange in line with the flange 720. The flange 720 can include an aperture 730. The aperture 730 can have any size, shape, and/or configuration. In one or more arrangements, the aperture 730 can be substantially rectangular.

In some instances, an adhesive can be provided on a workpiece interfacing-side 740 of the retainer 700. In some instances, the retainer 700 can include a backing to protect the adhesive. When ready for use, the backing can be removed to expose the adhesive.

The retainer installation tool 100 and/or the retainer 700 can be brought into contact with each other. For example, a person can manually bring the retainer installation tool 100 into contact with the retainer 700. The locating nose 132 of the retainer installation tool 100 can be received in an aperture in the sensor holder portion 710 of the retainer. The locking protrusion 129 of the retainer installation tool 100 can be received in the aperture 730. As a result, the retainer 700 can be retainably engaged by the retainer installation tool 100. A user can now move around with the retainer installation tool 100 without concern of the retainer 700 becoming separated from the retainer installation tool 100.

The retainer installation tool 100 can be used to install the retainer 700 on a workpiece. In one or more arrangements, the work piece can be a vehicle bumper or other vehicle body member. The workpiece can include an aperture for receiving the retainer 700. An adhesive or adhesion promoter can be placed on the work piece in and/or around the aperture. The adhesive or adhesion promoter can include one or more agents, substances, particles, etc. that, when impinged upon by light, cause a light signature to be presented. The adhesive or adhesion promoter can help the adhesive on the retainer to adhere to the workpiece and/or it can help to secure the retainer to the workpiece.

The retainer installation tool 100 can be brought near the workpiece. The light source(s) 640 can be activated, such as by user input provided on the input interface(s) 650. The light emitted by the light source(s) 640*c* can be directed toward the aperture. The light detector(s) 645 can acquire data about when the light emitted by the light source(s) 640 engages the workpiece and, more particularly, the adhesive. If the light signature is detected by the light detector(s) 645 and/or the control module(s) 680, the control module(s) 680 can cause an indicator to be presented to the user, indicating that an adhesive is present. For instance, the control module(s) 680 can cause the output interface(s) 660 to emit a visual, audial, and/or haptic indicator to the user. If the light signature is not detected by the light detector(s) 645 and/or the control module(s) 680, the control module(s) 680 can cause the retainer installation tool 100 to be deactivated or otherwise prevented from operating. In some instances, the control module(s) 680 can cause an indicator to be presented to the user, indicating that adhesive is not present on the workpiece.

If the retainer installation tool 100 indicates that an adhesive or adhesion promoter is present, then retainer installation tool 100 can be manipulated to insert the retainer 700 in the aperture in the workpiece. The paper or plastic backing can be removed from the retainer. The user can insert the locating nose 132 into the aperture. Once inserted, the user can press the retainer installation tool toward the workpiece.

Eventually, the retainer 700 can come into contact with the workpiece. The push ring 144 can be designed to push all around the retainer 700 to ensure good surface area pressure on the non-adhesive side of the retainer 700 and then this force is transferred to the workpiece as pressure over time is applied downward on the adhesive side and surface prepared workpiece receiving the retainer 700. The central aperture of the retainer 700 can be aligned with the aperture in the workpiece. In some instances, a portion of the retainer 700 can be received in the aperture of the workpiece. The aperture in the workpiece can allow a wire harness to be operatively connected to a sensor or other component held by the retainer 700.

It will be appreciated that, as the user presses down, a portion of the retainer installation tool 100 can be compressed. For instance, the platform 140 and the push ring 144 can move toward each other due to the second plurality of fasteners 156 being able to move within apertures 141 provided in the platform 140. Likewise, the lower body member 136 and the platform 140 can move toward each other, as the first plurality of fasteners 148 can move within the apertures 137 provided in the lower body member 136.

When fully pressed down, the push ring 144 can hold press the retainer 700 against the workpiece. The push ring 144 can provide a continuous contact surface between the retainer 700 and the workpiece. It will be appreciated that the part engaging surface(s) 138 can substantially matingly engage the workpiece.

The sensor(s) 630 can detect when a portion of the retainer installation tool 100 is in contact with the work piece. For example, the switch 635 can be activated when the lower body member 136 contacts the switch 635. When detected, the timer(s) 670 can begin counting. The timer(s) 670 can continue counting while the retainer installation tool 100 is in contact with the workpiece. The timer(s) 670 can count toward a predetermined amount of time. The predetermined amount of time can correspond to a time sufficient for the adhesive to cure or set to ensure that the retainer 700 will be sufficiently held on the workpiece.

When the predetermined amount of time has elapsed, the control module(s) 680 can cause an indicator to be presented to the user, indicating that the user can release the retainer 700 from the retainer installation tool 100. As an example, the control module(s) 680 can cause an audial indicator to be presented, such as by one or more speakers 665 of the output interface(s) 660.

When the audial indicator is provided, the user can separate the retainer installation tool 100 from the retainer 700. For instance, the user can engage the handle 108 and draw it toward the outer casing 102 of the retainer installation tool 100. As a result, the gear track(s) 116 operatively connected to the handle 108 can move in the same direction as the handle 108. The movement of the gear track(s) 116 can cause the gear track(s) 116 to enmeshingly engage with the gear segments 118 of the central shaft 110, causing the central shaft 110 to rotate.

The rotation of the central shaft 110 can cause a rotation of the cam disk 124. The cam disk 124 can physically pull the follower 128 and the locking protrusion 129. As a result, the locking protrusion 129 can move out of the aperture(s) 730 in the retainer 700. In some arrangements, the locking protrusion 129 can move inwardly toward the central shaft 110 and out of the aperture(s) 730. In some arrangements, the locking protrusion 129 can rotate out of the aperture(s) 730. Ultimately, the locking protrusion can disengage the retainer 700. Thus, the retainer 700 is free to be separated from the retainer installation tool 100.

At this point, the user can pull the retainer installation tool 100 away from the workpiece. Since the retainer 700 is disengaged from the locking protrusion 129, the retainer installation tool 100 can separate from the retainer 700. The retainer 700 can remain in place on the workpiece due to the adhesive.

The user can release the handle 108. The gear tracks 116 and the handle 108 can return to the normal position for subsequent use, such as due to the bias of the spring(s) 117.

It will be appreciated that arrangements described herein can provide numerous benefits, including one or more of the benefits mentioned herein. For example, arrangements described herein can result in manufacturing improvements. Arrangements described herein can facilitate proper retainer installation. Arrangements described herein can reduce manufacturing installation errors. Arrangements described herein can be adaptable in that a standard body can be used with different application heads to install retainers into bumpers. From a customer standpoint, arrangements described herein can facilitate the improved quality and accuracy of sonars used in vehicle safety. Arrangements described herein can lead to cost and/or weight savings over current installation tools and methods. Arrangements described herein can ensure that an adhesive or adhesion promoter are properly applied on a workpiece before installing a retainer on the workpiece. Various components of the retainer installation tool can be formed by three-dimensional printing, machined, compression molded, blow molded, vacuum formed, injection molded, or cast all out of various plastics, metals, or other materials. Arrangements described herein can avoid issues experienced with current installation tools. For instance, the retainer installation tool described herein can hold a retainer in place during the installation process. As a result, the retainer installation tool does not have to be picked up and set back down on the retainers during installation.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A retainer installation tool, comprising:

an outer casing;

a central shaft extending partially within the outer casing;

a handle operatively connected to cause rotation of the central shaft, the handle being operatively connected to the central shaft by one or more gear tracks that engage one or more gear segments on the central shaft;

a sensor;

a timer; and one or more processors operatively connected to the sensor and the timer and being configured to:

start the timer when the sensor is activated; and cause an alert to be presented when a predetermined amount of time has elapsed according to the timer, the retainer installation tool being configured to retainably engage a retainer and to selectively disengage the retainer when the central shaft is rotated.

2. The retainer installation tool of claim 1, further including:

a light source, wherein the light source is configured to emit light, and wherein the light source is positioned to emit light toward a work area; and a light detector, wherein the light detector is configured to detect a light signature in the work area when exposed to light from the light source.

3. The retainer installation tool of claim 2, further including a processor, wherein the processor is configured to cause an alert to be presented when a light signature is not detected in the work area when exposed to light from the light source.

4. The retainer installation tool of claim 1, wherein the sensor is a switch.

5. The retainer installation tool of claim 1, further including:

a locking protrusion, wherein the locking protrusion is configured to retainably engage a retainer on the retainer installation tool, wherein rotation of the central shaft causes the locking protrusion to disengage the retainer, whereby the retainer is free to be separated from the retainer installation tool.

6. The retainer installation tool of claim 5, further including:

a cam disk, wherein the cam disk is operatively connected to the central shaft, and wherein the cam disk includes a slot; and a follower, wherein a portion of the follower is received in the slot, and wherein the follower includes the locking protrusion, whereby the rotation of the central shaft causes a rotation of the cam disk, whereby the rotation of the cam disk pulls the follower with the cam disk so as to cause a retraction of the locking protrusion.

7. The retainer installation tool of claim 1, further including a lower body member, and wherein the lower body member includes a part engaging surface.

8. The retainer installation tool of claim 7, further including:

a push ring, wherein the push ring is configured to engage a retainer; and a platform located between the lower body member and the push ring.

9. The retainer installation tool of claim 8, wherein the push ring and the platform are configured to move relative to each other, and wherein the platform and the lower body member are configured to move relative to each other.

10. The retainer installation tool of claim 1, wherein the central shaft includes one or more spacers, wherein the spacers include an outer rim, wherein at least a portion of the outer rim is configured to contact or be adjacent to an inner peripheral surface of the outer casing, whereby the central shaft is substantially centered within the outer casing.

11. The retainer installation tool of claim 1, further including a locating nose operatively connected to a distal end of the central shaft, whereby the locating nose is usable to center the retainer installation tool on an aperture in a workpiece.

12. The retainer installation tool of claim 1, wherein, when the handle is engaged, the one or more gear tracks move to cause rotation of the central shaft by enmeshing engagement with the one or more gear segments on the central shaft.

13. A retainer installation tool, comprising:
an outer casing;
a central shaft extending partially within the outer casing and including one or more gear segments;
a handle, one or more gear tracks being operatively connected to and extending away from the handle, the one or more gear tracks engaging the one or more gear segments,
when the handle is engaged, the one or more gear tracks move to cause rotation of the central shaft by enmeshing engagement with the one or more gear segments;
a locking protrusion configured to retainably engage a retainer on the retainer installation tool, the retainer installation tool being configured to selectively disengage the retainer when the central shaft is rotated, whereby the retainer is free to be separated from the retainer installation tool;
a lower body member including a part engaging surface;
a push ring configured to engage a retainer; and
a platform located between the lower body member and the push ring,
the push ring and the platform being configured to move relative to each other, and the platform and the lower body member being configured to move relative to each other.

14. The retainer installation tool of claim 13, further including:
a light source, wherein the light source is configured to emit light, and wherein the light source is positioned to emit light toward a work area;
a light detector, wherein the light detector is configured to detect a light signature in the work area when exposed to light from the light source; and
a processor operatively connected to the light source and the light detector, wherein the processor is configured to:
cause an alert to be presented when a light signature is not detected in the work area when exposed to light from the light source.

15. The retainer installation tool of claim 14, wherein the light source is an ultraviolet light source.

16. A retainer installation tool, comprising:
an outer casing;
a central shaft extending partially within the outer casing and including one or more gear segments;
a handle operatively connected to the central shaft by one or more gear tracks, the one or more gear tracks engaging the one or more gear segments,
when the handle is engaged, the one or more gear tracks move to cause rotation of the central shaft by enmeshing engagement with the one or more gear segments;
a locking protrusion configured to retainably engage a retainer on the retainer installation tool, the retainer installation tool being configured to selectively disengage the retainer when the central shaft is rotated, whereby the retainer is free to be separated from the retainer installation tool;
a sensor;
a timer; and
a processor operatively connected to the sensor and the timer, the processor being configured to:
start the timer when the sensor is activated; and
cause an alert to be presented when a predetermined amount of time has elapsed according to the timer.

17. A retainer installation tool, comprising:
an outer casing;
a central shaft extending partially within the outer casing and including one or more gear segments;
a handle, one or more gear tracks being operatively connected to and extending away from the handle, the one or more gear tracks engaging the one or more gear segments,
when the handle is engaged, the one or more gear tracks move to cause rotation of the central shaft by enmeshing engagement with the one or more gear segments;
a cam disk operatively connected to the central shaft and including a slot; and
a follower, a portion of the follower being received in the slot, and the follower including a locking protrusion configured to retainably engage a retainer on the retainer installation tool,
whereby rotation of the central shaft causes a rotation of the cam disk, whereby the rotation of the cam disk pulls the follower with the cam disk so as to cause a retraction of the locking protrusion such that the locking protrusion disengages the retainer, whereby the retainer is free to be separated from the retainer installation tool.

18. A retainer installation tool, comprising:
an outer casing;
a central shaft extending partially within the outer casing and having an axis of rotation;
a handle operatively connected to cause rotation of the central shaft;
a sensor;
a timer;
one or more processors operatively connected to the sensor and the timer and being configured to:
start the timer when the sensor is activated; and
cause an alert to be presented when a predetermined amount of time has elapsed according to the timer,
the retainer installation tool being configured to retainably engage a retainer and to selectively disengage the retainer when the central shaft is rotated,
a lower body member including a part engaging surface;
a push ring configured to engage a retainer; and
a platform located between the lower body member and the push ring, the sensor being located on the platform, and
when the retainer installation tool is compressed in a direction corresponding to the axis of rotation and/or an amount of pressure or force is applied on the retainer installation tool downwardly in the direction, the sensor becomes physically engaged by the lower body member, whereby the sensor is activated.

* * * * *